UNITED STATES PATENT OFFICE 1,999,621

PROCESS OF ABSORBING OLEFINES HAVING THREE OR MORE CARBON ATOMS IN THE MOLECULE IN STRONG ACIDS

Adrianus Johannes van Peski, Amsterdam, Netherlands, assignor, by mesne assignments, to Shell Development Company, San Francisco, Calif., a corporation of Delaware No Drawing. Application May 17, 1930, Serial No. 453,404. In Great Britain June 4, 1929

8 Claims. (Cl. 260—99.12)

This invention concerns an improved method of absorbing olefines having three or more carbon atoms and one or more double bonds in the molecule in suitable strong acids and it concerns also the production of the corresponding esters, ethers, alcohols or other compounds therefrom.

It is an object of this invention to provide a process of the aforesaid nature, by which the rate of absorption may be considerably increased as compared with that of the known processes of absorbing olefines in strong acids. Another important object of the invention is to avoid entirely or as far as possible the formation of undesirable oily polymerization products, which are frequently formed when absorbing olefines in the aforementioned manner by the usual methods.

It is known that ethyl alcohol, isopropyl alcohol, butyl alcohol and the like may be obtained by combining the corresponding olefines with sulphuric acid and hydrolyzing the sulphates obtained. Besides alcohols, other compounds such as esters or ethers may be prepared by first absorbing the olefines in sulphuric acid and then converting the reaction products in a known manner.

The rate of absorption of olefines by means of sulphuric acid in the usual way is generally slow. Different catalysts have been proposed for increasing the rate of absorption; a large group of very active catalysts for said purpose have been described in British Patent No. 323,748.

It has now been found that other substances also serve to facilitate the reaction.

According to this invention the improved method of absorbing olefines having three or more carbon atoms and one or more double bonds in the molecule and/or their polymerization products in strong acids in the presence of catalysts is characterized by employing as catalysts those comprising iron, copper, cobalt, nickel, silver or metals of the platinum group or compounds of any of the said metals.

The invention also consists in employing as the absorption media strong acids containing as catalysts compounds of any of the aforesaid metals in a soluble form. The compounds may be dissolved in the acids or soluble complex compounds may be formed within the acids.

If the aforesaid metals are used they should preferably be brought into a very finely divided condition for example colloidally precipitated on a carrier such as carbon black, silica gel, decolorizing clay or the like.

Sometimes it is advantageous previously to convert the aforesaid substances into soluble complex compounds, examples of which will be given hereinafter.

Such metal compounds as have the metal in its highest valency state as well as those in which it is in a lower valency state may be used, for example both platinous and platinic compounds are suitable.

The soluble compounds may be formed from such of the above metals as are attacked by the strong acid by the addition of such metals to the said acids or the soluble compounds may be those obtainable from metals or compounds brought into a soluble form by conversion into soluble complex compounds.

The following examples illustrate how the process of this invention may be carried into effect:

1. 25 grams of carbon black containing 2 grams of platinum finely distributed therein are added to 100 cc. of 90 per cent sulphuric acid. 10 litres of propylene are passed through the mass, when 85 per cent of the propylene is absorbed.

2. When propylene is passed through 100 cc. of 90 per cent sulphuric acid, in which 5 grams of cuprous cyanide has been dissolved, 71 per cent of the propylene is absorbed.

3. 5 grams of cuprous oxide are added to 100 cc. of 90 per cent sulphuric acid. A stream of carbon monoxide is then passed through the mass, forming a soluble complex compound with the cuprous oxide. Propylene is now passed through the absorbing liquid, when 90 per cent of the propylene is absorbed.

Instead of carbon monoxide, ethylene or nitric oxide (NO) may be used for converting various insoluble compounds of the aforementioned metals into soluble complex compounds.

The reaction may be performed at ordinary, lower or higher pressures and temperatures. Other acids such as phosphoric acid or sulphonic acids e. g. benzene sulphonic acid may also be used as absorption liquids.

It is well known that various acids such as phenolsulphonic, hydrochloric, hydrobromic, hydriodic, acetic, boric, phosphoric and sulphuric acids may be used for the absorption of olefines. Other sulphonic acids such as benzene sulphonic and chlorosulphonic acids will absorb olefines.

Moreover the process may be carried out in the presence of substances which are known to accelerate the absorption reaction, such as foam- or froth-forming substances, emulsifiers and the like. Furthermore the olefines to be absorbed may be dissolved in suitable solvents before being brought into contact with the strong acid.

In order to promote the solubility of the olefines suitable solvents such as alcohol, ether, nitrobenzol or acetic acid may be added to the strong acid.

The strong acids containing absorbed ethylene are subjected to treatment such as by hydrolysis and/or distillation or in other known manner for the production of compounds such as alcohols, esters or ethers.

Also mixtures of the aforementioned catalysts may be used. Furthermore the method of this invention may be applied to gases, such as natural gas, "cracked" gas or the like, which contain olefines having three or more carbon atoms and one or more double bonds in the molecule, without previously separating said olefines from the gases.

I claim as my invention:—

1. An improved method of absorbing an olefine having at least three carbon atoms and at least one double bond in its molecule, in a strong acid in the presence of a catalyst which comprises contacting said olefine with a strong acid in the presence of at least one absorption catalyst of the class consisting of metals of the eighth group of the periodic table, soluble compounds of the iron group and compounds of the platinum group.

2. An improved method of absorbing an olefine having at least three carbon atoms and at least one double bond in its molecule, in a strong acid in the presence of a catalyst which comprises contacting said olefine with a strong acid in the presence of at least one metal of the eighth group of the periodic table.

3. An improved method of absorbing an olefine having at least three carbon atoms and at least one double bond in its molecule, in a strong acid in the presence of a catalyst which comprises contacting said olefine with a strong acid in the presence of at least one soluble compound of a metal of the eighth group of the periodic table.

4. An improved method of absorbing an olefine having at least three carbon atoms and at least one double bond in its molecule, in a strong acid in the presence of a catalyst which comprises contacting said olefine with a strong acid in the presence of at least one compound of a metal of the platinum group.

5. An improved method of absorbing an olefine having at least three carbon atoms and at least one double bond in its molecule, in a strong acid in the presence of a catalyst which comprises contacting said olefine with a strong acid in the presence of at least one soluble complex compound of a metal of the eighth group of the periodic table.

6. An improved method of absorbing an olefine having at least three carbon atoms and at least one double bond in its molecule, in a strong acid in the presence of a catalyst which comprises contacting said olefine with a strong acid containing a metal of the iron group.

7. An improved method of absorbing an olefine having at least three carbon atoms and at least one double bond in its molecule, in a strong acid in the presence of a catalyst which comprises contacting said olefine with a strong acid containing a soluble compound of a metal of the iron group.

8. An improved method of absorbing an olefine having at least three carbon atoms and at least one double bond in its molecule, in a strong acid in the presence of a catalyst which comprises contacting said olefine with a strong acid containing a reaction product of said acid and a metal of the iron group.

ADRIANUS JOHANNES van PESKI.